Patented June 26, 1951

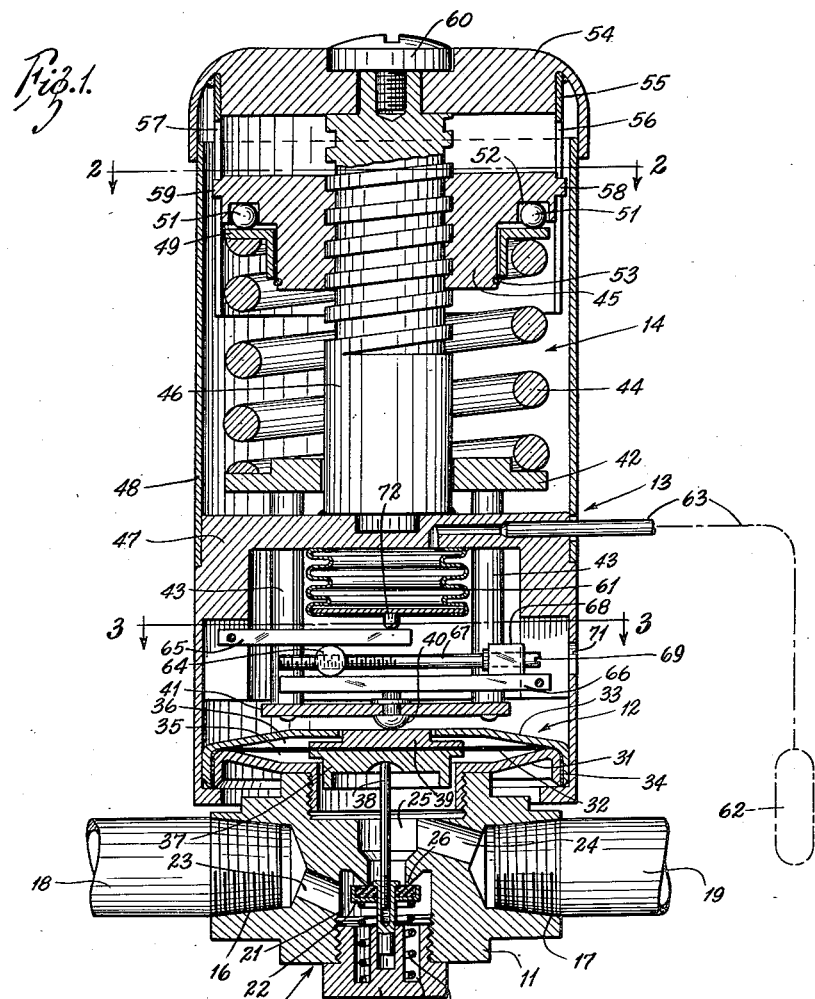
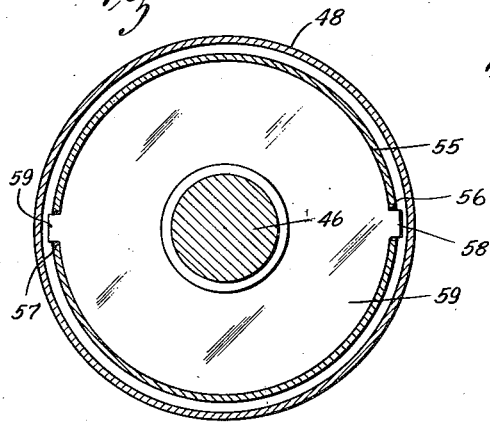
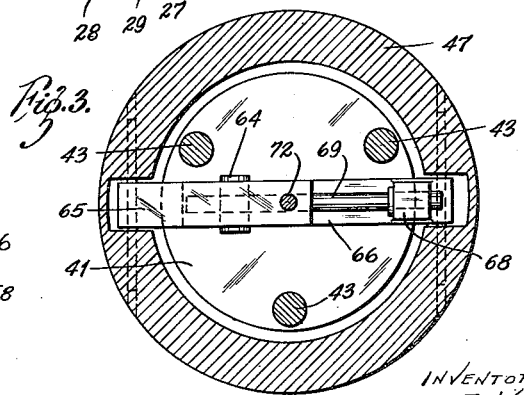

2,558,651

UNITED STATES PATENT OFFICE 2,558,651

THERMOSTATICALLY CONTROLLED PRESSURE REGULATING VALVE

Clifford B. Ives, Tenafly, N. J., assignor to Alco Valve Company, University City, Mo., a corporation of Missouri Application December 28, 1944, Serial No. 570,068

5 Claims. (Cl. 236—92)

This invention relates to valve devices generally, and concerns itself more particularly with a pressure regulating valve having a temperature-responsive element acting to superimpose a control on the valve in accordance with a temperature measurement.

It is an object of the invention to provide a pressure regulating valve having a temperature-responsive device operable to control the pressure regulation as a function of a measured temperature and a variable loading force.

Another object of the invention is to provide a pressure regulating valve capable of giving a pressure regulation which is a function of a measured temperature.

As another object of the invention, it is intended to provide a conventional pressure regulating valve with a temperature-responsive device which will add to the forces exerted by the pressure loading element thereof an additional force that is a function of a measured temperature.

Yet another object of the invention is to provide a valve, which is normally closed, with a spring loaded pressure-responsive element capable of opening said valve in accordance with the pressure of a pressure exerting medium appearing at one of the orifices of the valve and having a temperature-responsive element arranged to add to the force of the spring loading means a force which is a function of a temperature measurement.

A still further object of the invention is to provide a pressure regulating valve having means for effecting a pressure regulation which is a function of a loading force and a temperature measurement and apparatus for varying the loading force and the force exerted by the temperature-responsive control.

Other objects and advantages will become apparent as the description proceeds, and a more comprehensive understanding of the invention will be afforded from the following detailed description when considered with the accompanying drawing in which:

Fig. 1 is a vertical sectional view of a valve device embodying the invention in a preferred form;

Fig. 2 is a cross-sectional view taken along the line 2—2 of Fig. 1 and showing, in part, a spring loading means employed in the valve device; and Fig. 3 is a cross-sectional view taken along the line 3—3 of Fig. 1 and showing an adjusting means employed to control the temperature-responsive element of the valve device.

Like reference numerals have been employed throughout the drawings to designate like parts.

With reference to Fig. 1 of the drawings, the valve device here illustrated embodies the invention is a preferred form which provides for a valve body 11, a pressure-responsive control assembly 12, a temperature-responsive device 13, and a loading device 14. These parts are arranged so that a valve, generally designated 15, is controlled by the pressure-responsive element 12 to regulate the pressure of a medium flowing through the valve in accordance with a force exerted by the spring loading means 14 and that exerted by the temperature-responsive device 13.

The valve body 11 is provided with the orifices 16 and 17 which are internally threaded to receive the connections 18 and 19, respectively. A valve cavity 21 provides a space in which a soft valve disc 22 moves to open and close the valve. The orifice 16, which, for the purpose of illustration, may be considered as the inlet, is connected directly to the valve cavity 21 by a port 23, and the outlet orifice 17 is communicable therewith by means of a port 24 and a valve stack 25. In its normal position, the disc 22 is urged against its seat 26 by a valve spring 27. The valve disc is easily accessible through an opening in the valve body in which a plug 28 is screwed. This plug is recessed at 29 to provide a suitable retainer for the valve spring 27.

The pressure-responsive element 12 is threaded to the top of the valve body 11 and comprises a lower plate 31, a diaphragm 32, and an upper plate 33. These elements are welded together at their common points of contact 34 extending around their circumferences and form two chambers 35 and 36. A lower buffer plate 37 bears against a valve stem 38 which is connected to the valve disc 22 and is so arranged in the pressure chamber 35 that downward movement of the diaphragm causes the valve disc to be moved to open the valve 15. A top buffer plate 39 extends through a suitable aperture in the upper plate 33 and forms a bearing surface for receiving the forces applied by the loading mechanism 14 and the temperature-responsive device 13.

The forces just mentioned are applied to the pressure-responsive element 12 by a button 40 which operates against the top buffer plate 39. The top buffer plate 39 rests on the diaphragm 32 and is in contact with a plate 41 through the button 40. The plate 41 is connected to a spring and plate 42 by means of three yoke rods 43. A loading force is exerted by the loading means 14 and is developed by a compression spring 44 which acts against the spring end plate 42. This spring is carried in compression between the plate 42 and a spring nut 45, and its force is varied by the vertical movement of the nut along a stud 46. The stud, in turn, is supported by a cross member 47 fastened to a shell 48 forming a housing for the pressure-responsive device 12, the temperature control 13, and the spring loading means 14.

The stud 46 is threaded to receive the spring nut 45, and, as the nut is turned downwardly along the stud, the compressive forces of the spring 44 are increased. Because of the large forces exerted, a ball bearing assembly is utilized to facilitate the rotation of the nut. At the top of the spring 44, a collar 49 is provided upon and against which the compressive forces produced by the spring through the rotation of the nut 45 are exerted. These forces are transmitted through the ball bearings 51 which are retained in a race 52 channeled in a flange of the nut. In order that movement of the nut away from the spring will not release the ball bearings 51, the collar 49 is clamped to the nut 45 by means of a lock ring 53. This ring prevents the separation of the collar 49 from the nut, and the bearings 51 are confined to their race 52.

A knob 54 forms a suitable closure for the shell 48 and effects the rotation of the nut 45 through forces applied by a torque tube 55 secured thereto. The walls of this tube are broken by a pair of vertical slots 56 and 57 into which a pair of lugs 58 and 59, both forming parts of the nut 45, are respectively extended. The knob 54 is shaped to form a top for the casing 48 and is attached to the assembly by means of a screw 60 engageable in the stud 46. Rotation of the knob 54, and incidentally the torque tube 55, applies a force to the lugs 58 and 59 to turn the nut 45. Vertical extensions of the slots 56 and 57 provide channels in which the lugs may move due to the movement of the nut 45 along the stud 46.

A temperature function is added to the control by the means of the temperature-responsive device 13 which comprises a bellows 61 soldered to the cross member 47. This bellows is connected to a thermometer bulb 62 by means of a capillary tube 63, and the regulated pressure maintained at the orifice 17 of the valve is made to be a function of a temperature measured by the thermo-bulb 62. The forces generated in the bellows 61, due to the expansion of the thermo fluid in the thermo-bulb 62, are transmitted to the diaphragm 32 of the pressure-responsive device 12 through the plate 41 and an adjustable fulcrum 64. This fulcrum is arranged for movement in a compound lever mechanism having a primary lever 65 and a secondary lever 66, the latter of which bears against the button 40 extending through the plate 41. The adjustable fulcrum 64 is carried by an adjusting screw 67 which is journaled for rotation in a block 68 forming an extension of the lever 66. The screw 67 is headed and provided with a keyway 69 into which a suitable tool may be inserted for adjusting the position of the fulcrum 65. A window 71 in the shell 48 is aligned with the keyway and affords an entrance for the tool. Further, a pressure point 72 is provided on the end of the bellows 61 and acts against a surface of the lever 65.

*Operation*

The valve device above described finds its use in connection with any apparatus in which a regulated pressure is to be conditioned upon a measured temperature as a function. By way of example, these requirements are imposed in the carbonation of beverages. Here, the carbonating gas pressure is varied directly in relationship with the temperature of the fluid which is being carbonated. Under such operation, the valve is arranged to receive the carbonic gas at the inlet orifice 16 for transmission therethrough to the outlet orifice 17. It is to be noted that the outlet orifice 17 is connected through the port 24 and the valve stack 25 to the pressure chamber 35 of the pressure-responsive device 12. Thus, the pressure of the pressure exerting medium appearing at the outlet orifice 17 acts against the diaphragm 32, tending to equalize the pressure applied to the top of the diaphragm by the temperature-responsive device 13 and the loading device 14. The desired pressure at which the gas is to be maintained at the outlet orifice 17 is fixed by turning the knob 54 to compress the spring 44 to the desired tension. This force then is applied through the plate 42, the yoke 43 and the plate 41, to the top of the diaphragm 32 causing it to deflect downward, thus opening the valve 22 allowing pressure to build up in the system. When the pressure in the system exerts a force upward on the diaphragm equal to the downward force mentioned above, the valve 22 approaches the closing position and throttles to maintain this pressure. The amount of pressure applied through the loading means 14 determines the pressure at which the valve 15 will close. When the pressure exerted against the diaphragm in the pressure chamber 35 drops to a value which is insufficient to overcome all of the forces appearing on the top buffer plate 39, the diaphragm is pushed downwardly and the valve is opened, thereby permitting a pressure increase on the outlet side of the valve. When this increase in pressure reaches a point sufficient to balance out the forces being applied to the top of the diaphragm, the latter element is carried upwardly and the disc 22 is urged against its seat 26 to throttle the valve. Insofar as pressure control alone is concerned, the outlet pressure may be maintained constant at a predetermined value fixed by the adjustment of the spring loading means 14.

In addition to being regulated as a function of forces applied by the spring loading means 14, however, the pressure is also controlled as a function of a measured temperature by the device 13. This control is effected by placing the thermometer bulb 62 at a point where it may register the temperatures which are to provide the additional control. Should there be an increase in temperature at the thermo-bulb 62, there will be a corresponding increase in pressure within the bellows 61, and a downward force will be added to that produced by the spring means 14. Both of these forces will act on the diaphragm to cause the valve to open until the pressure has again increased to an amount sufficient to force the diaphragm upwardly and move the valve to its normally closed position. In the same manner, should the temperature at 62 decrease, the force exerted downwardly by the bellows 61 will be decreased and combined forces exerted downward on the diaphragm 32 will be decreased. This will allow the diaphragm 32 to move upwardly and close the valve 15 until the pressure drops to a point where it again equals the combined downward forces exerted by the spring loading means 14 and that of the temperature-responsive apparatus 13.

Through the action just described, the valve device is operative to provide a pressure regulation at the outlet orifice 17 which is a function of the force developed by the loading means 14 and a temperature measurement recorded at the bulb 62. The latter control is superimposed on that provided by the spring loading device, and the pressure regulation effected thus becomes a function of these combined forces.

Further, the amount of force added by the temperature-responsive device 13 may be varied. When the screw 67 is rotated to move the fulcrum 64 to its extreme left hand position (Fig. 1), a very slight change in temperature at the bulb 62 results in a marked increase in pressure on the controlled side of the valve. Conversely, if the fulcrum is positioned to the extreme right, a substantial change in temperature at 62 produces only a slight change in the controlled pressure. Obviously, intermediate positions of the fulcrum 64 provide a gradation of pressure changes between the two extremes.

From the adjustments afforded, namely, those provided for the loading device 14 and the temperature-responsive means 13, it is possible to select an infinite number of operating pressures at which regulation will be accurately maintained as a function of a number of processing temperatures bearing a predetermined ratio to pressure.

The importance of these adjustments may be exemplified by again returning to the requirements imposed in the process of carbonating liquids for carbonated beverages. Here, for each desired degree of carbonation, temperature pressure curves are plotted which show the amount of gas pressure necessary to produce the desired degree of carbonation for various temperatures of the liquid being carbonated. Since the slopes of these curves vary for different concentrations, and, further, since the pressure temperature relationship is not a straight line function, a given increase in temperature of the liquid for one degree of carbonation will require a different pressure increase of the gas than that which would be required for another concentration of carbonation. Hence, the pressure of the carbonating gas must bear a different predetermined ratio to temperature variations of the liquid for each degree of concentration. By adjusting the fulcrum 64 in the instant device, the superimposed thermo control, acting together with the pressure control effected by the loading means 14, may be set at any predetermined ratio so that the various degrees of carbonation may be maintained.

While a particular embodiment of the invention has been shown and described, it is apparent that changes and modifications could be made thereto without departing from the scope of the invention. Accordingly, the description and illustration are to be considered as illustrative only and not in a limiting sense.

What is claimed is:

1. In a fluid valve mechanism, a housing having an inlet and an outlet, a port therebetween, a valve controlling flow through the port, a diaphragm on the casing subjected on one side to a fluid pressure in the housing, means causing the diaphragm to effect operation of the valve, a coil spring, abutment means on the housing to receive one end of the spring, movable spacer means receiving the other end of the spring and applying the force thereof to the diaphragm oppositely to the fluid pressure, a fluid pressure bellows contained within the spacer means, having one end fixed to the housing and the other end movable toward the diaphragm when the fluid pressure in the bellows increases, and means to apply the force exerted by the movable end of the bellows to the diaphragm on the same side as the spring.

2. In a fluid valve mechanism, a housing having an inlet and an outlet, a port therebetween, a valve controlling flow through the port, a diaphragm on the casing subjected on one side to a fluid pressure in the housing, means causing the diaphragm to effect operation of the valve, a coil spring, abutment means on the housing to receive one end of the spring, movable spacer means receiving the other end of the spring and applying the force thereof to the diaphragm oppositely to the fluid pressure, a fluid pressure bellows contained within the spacer means, having one end fixed to the housing and the other end movable toward the diaphragm when the fluid pressure in the bellows increases, means to apply the force exerted by the movable end of the bellows to the diaphragm on the same side as the spring, said last means including a lever pivoted to the housing and a fulcrum therefor, and means to adjust the fulcrum toward and from the pivot.

3. In a fluid valve mechanism, a housing having an inlet and an outlet, a port therebetween, a valve controlling flow through the port, a diaphragm on the casing subjected on one side to a fluid pressure in the housing, means causing the diaphragm to effect operation of the valve, a casing extending upwardly from the housing, a partition across the casing, a pressure plate above the diaphragm to apply forces to the other side thereof, a plurality of vertically slidable members extending upwardly from the plate through the partition, spring means above the partition acting downwardly on the slidable members, means on the casing confining the opposite end of the spring means, a bellows secured to the lower side of the partition between the slidable members and having an end expansible downwardly toward the plate, and adapted to produce downward forces, and means transmitting said downward forces to the plate.

4. In a fluid valve mechanism, a housing having an inlet and an outlet, a port therebetween, a valve controlling flow through the port, a diaphragm on the casing subjected on one side to a fluid pressure in the housing, means causing the diaphragm to effect operation of the valve, a casing extending upwardly from the housing, a partition across the casing, a pressure plate above the diaphragm to apply forces to the other side thereof, a plurality of vertically slidable members extending upwardly from the plate through the partition, spring means above the partition acting downwardly on the slidable members, means on the casing confining the opposite end of the spring means, a bellows secured to the lower side of the partition between the slidable members and having an end expansible downwardly toward the plate, and adapted to produce downward forces, means transmitting said downward forces to the plate, said means comprising a pair of levers extending oppositely from the casing toward the center, a fulcrum between them, means for adjusting the fulcrum between the ends of the levers, means to apply the force of the bellows to one lever, and means to apply the forces from the other lever to the pressure plate.

5. In a fluid valve mechanism, a housing having an inlet and an outlet, a port therebetween, a valve controlling flow through the port, a diaphragm on the casing subjected on one side to a fluid pressure in the housing, means causing the diaphragm to effect operation of the valve, a casing extending upwardly from the housing, a partition across the casing, a pressure plate above the diaphragm to apply forces to the other side thereof, a plurality of vertically slidable members extending upwardly from the plate through the partition, spring means above the partition acting downwardly on the slidable members, a post extending non-rotatably upwardly from the partition inside the spring, an abutment threadedly mounted on the post to confine the opposite end of the spring, a cap over the top of the casing, and rotatable on the post, means connecting the cap and the abutment for rotation of the latter by the former, a bellows secured to the lower side of the partition between the slidable members and having an end expansible downwardly toward the plate, and adapted to produce downward forces, and means transmitting said downward forces to the plate.

CLIFFORD B. IVES.

REFERENCES CITED

The following references are of record in the file of this patent:

UNITED STATES PATENTS

| Number | Name | Date |
|---|---|---|
| 1,747,958 | Thompson | Feb. 18, 1930 |
| 1,782,688 | Hoffman | Nov. 25, 1930 |
| 1,787,146 | Craig | Dec. 30, 1930 |
| 1,920,505 | Henney et al. | Aug. 1, 1933 |
| 1,974,631 | Slagel | Sept. 25, 1934 |
| 1,983,218 | Dunham | Dec. 4, 1934 |
| 2,006,035 | Stewart | June 25, 1935 |
| 2,112,344 | Otto | Mar. 29, 1938 |
| 2,231,696 | Wolfe | Feb. 11, 1941 |
| 2,334,803 | Andersson | Nov. 23, 1943 |